United States Patent [19]

Salensky et al.

[11] 4,417,007
[45] Nov. 22, 1983

[54] ZINC RICH PAINT FORMULATIONS EMPLOYING MANGANOMANGANIC OXIDE FUME PIGMENT

[75] Inventors: George A. Salensky, Whitehouse Station, N.J.; Kuldip S. Chopra, Grand Island; Nicholas J. Pappas, Somers, both of N.Y.

[73] Assignee: Elkem Metals Company, Pittsburgh, Pa.

[21] Appl. No.: 381,790

[22] Filed: May 26, 1982

Related U.S. Application Data

[63] Continuation-in-part of Ser. No. 278,967, Jun. 30, 1981, abandoned.

[51] Int. Cl.³ .................. C08K 3/22; C09D 3/58; C09D 5/08
[52] U.S. Cl. .................... 523/442; 106/1.17; 106/14.34; 106/14.39; 523/459; 524/356; 524/361; 524/379; 524/431
[58] Field of Search ............ 106/1.17, 14.34, 14.39, 106/; 523/442, 459; 524/356, 361, 379, 431; 75/80

[56] References Cited

U.S. PATENT DOCUMENTS

| | | | |
|---|---|---|---|
| 3,305,352 | 2/1967 | Day | 75/80 |
| 3,975,322 | 8/1976 | Reinshagen et al. | 106/14.35 |
| 4,230,496 | 10/1980 | Falcone et al. | 106/1.17 |
| 4,239,539 | 12/1980 | Ginsberg et al. | 106/1.17 |
| 4,254,009 | 3/1981 | Dittrich et al. | 106/1.17 |

FOREIGN PATENT DOCUMENTS

| | | | |
|---|---|---|---|
| 2831269 | 1/1980 | Fed. Rep. of Germany | 106/1.17 |
| 50-32230 | 7/1975 | Japan | 106/14.34 |
| 50-32245 | 10/1975 | Japan | 106/1.17 |
| 54-17939 | 2/1979 | Japan | 106/14.34 |

OTHER PUBLICATIONS

Chemical Abstracts, vol. 56, No. 3, Feb. 5, 1962, p. 2244i.

*Primary Examiner*—Ronald W. Griffin
*Attorney, Agent, or Firm*—Eyre, Mann, Lucas & Just

[57] ABSTRACT

Paint formulations employing zinc and manganomanganic oxide fume or a material containing predominantly manganomanganic oxide fume as a corrosion inhibitive system.

11 Claims, No Drawings

ZINC RICH PAINT FORMULATIONS EMPLOYING MANGANOMANGANIC OXIDE FUME PIGMENT

This patent application is a continuation-in-part of application Ser. No. 278,967 filed June 30, 1981 and now abandoned.

The present invention relates generally to zinc rich paints. More specifically, the invention relates to zinc rich paints containing a manganomanganic oxide fume pigment which substantially improves the corrosion resistant properties of these paints.

Zinc rich paints are composed of a binder to which zinc dust is added. The concentration of zinc in a solvent free binder is generally in excess of 75% by weight when it is used as the sole pigment. These paints are prepared by mixing zinc dust together with optional pigments, a resin binder, solvent and other known ingredients such as dispersants, stabilizers, etc. The optional pigments should enhance corrosion resistance as well as produce a distinctive and pleasant color when added to paint formulations either alone or together with other pigments. Additionally, the pigments must be stable so as to retain their color for a prolonged period of time. Another important requirement is that the pigments should have a very finely-divided particle size generally less than about ten microns, for example. The fine particles enhance the ability of the pigments to be easily dispersed throughout the paint mixture during processing and further assure that the paint can be evenly distributed in a thin layer upon application to a surface without any streaks or other imperfections and thus provide uniform corrosion protection. This latter requirement is most significant of course in those instances where the paint is to be applied by conventional brush and roller techniques.

In our co-pending application Ser. No. 381,791 filed May 26, 1982 which is a continuation-in-part of application Ser. No. 279,097 filed June 30, 1981, now abandoned, there is disclosed a solvent-base paint formulation employing an improved color pigment comprising manganomanganic oxide fume ($Mn_3O_4$) or a material containing manganomanganic oxide fume as its principle ingredient. It has been found that $Mn_3O_4$ fume when used as a color pigment exhibits a deep reddish-brown color which is similar to but yet readily distinguishable from the brown color pigmentation produced by synthetic iron oxide pigments, e.g., yellow, tan or red iron oxide pigments, and has a very fine particle size on the order of about 10 microns which enables the pigment to be uniformly distributed throughout the entire paint composition.

The $Mn_3O_4$ fume of the present invention is most conveniently prepared by passing a stream of oxygen through or across the surface of a molten bath of ferro-manganese. Conventional ferro-manganese produced in a blast furnace or in an electrometallurgical furnace and the like at high temperatures of about 1200° C. or more may contain up to 6 or more percent of carbon. The carbon content is usually reduced, as for example, to about 1.5% by blowing oxygen or a mixture of oxygen and air through or against the surface of a bath of molten ferro-manganese. This is done in a separate vessel that contains a molten ferro-manganese bath freshly tapped tapped from the electric furnace and at a temperature of about 1000° C. or more and preferably at about 1300° C. or more.

One procedure for reducing the carbon content of molten ferro-manganese is described in U.S. Pat. No. 3,305,352 issued Feb. 21, 1967, the description of which is incorporated by reference herein. In this preferred procedure for producing the manganomanganic oxide fume of the present invention, ferro-manganese is tapped from the electric furnace in which it is produced into a treating vessel such as a ladle or furnace at a temperature of about 1300° C. or more. Any slag is preferably skimmed off and then oxygen is top blown against the surface of the molten ferro-manganese bath by any convenient means such as one or more conventional oxygen blowing lances held about an inch above the surface to direct one or more streams of oxygen at a pressure of about 110 to about 150 p.s.i. to impinge against the surface of the bath. The flow of oxygen is about 4 to 5 pounds per minute for a 500 pound molten bath in a ladle about 30 inches high and 20 inches inside diameter. The foregoing procedure may be scaled up as desired. The off-gas thereby produced contains very finely divided particles of manganomanganic oxide fume of spherical configuration which are easily recovered from the off-gas by conventional recovery apparatus.

If desired the manganomanganic oxide fume of the present invention may be produced as a by product of the specific procedure described in U.S. Pat. No. 3,305,352 for reducing the carbon content of the ferro-manganese bath. In such case, the ferro-manganese bath will be at a temperature of about 1250° C. and oxygen will be top blown at a rate sufficient to heat the bath to a temperature of 1700° C. before the carbon content of the molten metal has been reduced to 1.5%. Oxygen blowing will continue until the bath temperature reaches about 1750° C. as described in the patent. The manganomanganic oxide fume is recovered from the off-gas in conventional manner.

The terms $Mn_3O_4$ fume and manganomanganic oxide fume used in the specification and claims herein mean the finely divided spherical particles of fume recovered from the oxygen blowing of molten ferro-manganese as described above.

The foregoing and other related objects and advantages of the present invention are achieved by an improved color pigment for use in solvent-base paints which comprises manganomanganic oxide ($Mn_3O_4$) fume or a material containing manganomanganic oxide fume as its principle ingredient and zinc dust. "Zinc dust" as used herein and in the appended claims means very finely-divided zinc particles having an average particle size of between about 2 and 40 microns. The $Mn_3O_4$ fume-zinc pigment may be employed in the paint formulation together with a main binder, solvent and other ingredients such as pigment extenders, suspension agents, etc. Typically, the $Mn_3O_4$ fume-zinc pigment may comprise from about 74 to 96 percent by weight of the total paint composition on a solvent free basis. A more preferred range is from about 80 to 92 percent by weight.

The present invention is based upon the discovery that manganomanganic oxide fume or a material containing predominantly manganomanganic oxide fume in a finely-divided or a comminuted state when used as a color pigment in zinc rich solvent-base paints, surprisingly produces coatings on metal substrates having corrosion resistant properties which are superior to similar coatings made solely with $Mn_3O_4$ fume or zinc pigments above. The amount of corrosion protection afforded by the paint formulation is dependent upon the manganomanganic oxide fume-zinc ratio.

When used as a color pigment, $Mn_3O_4$ fume exhibits a deep reddish-brown color which is similar to but yet readily distinguishable from the brown color pigmentation produced by conventional synthetic iron oxide pigments, e.g., yellow, tan or red iron oxide pigments. The $Mn_3O_4$ fume pigment can also be produced in a range of particle sizes which approach the finely-divided particle size of conventional paint pigments. This is a very important factor in preparing solvent-base paints for a number of reasons, e.g., the fine particles enhance suspension properties and enable the pigment to be uniformly distributed throughout the entire paint composition. Generally, the $Mn_3O_4$ fume pigment should have a particle size such that about 98% of the particles are less than about ten microns.

As indicated, the color pigment used in the practice of the present invention is composed of manganomanganic oxide fume or may be a material containing predominantly manganomanganic oxide fume, i.e., greater than about 60% by weight. Such a material is the manganomanganic oxide fume described above which is produced as a by-product of the high temperature oxidation reaction carried out during the production of ferro-manganese.

The data given below outlines some typical characteristics of the manganomanganic oxide fume produced as specified hereinabove for carrying out the present invention.

Chemical Formula: Essentially $Mn_3O_4$.

Typically, 96% to 98% by weight manganomanganic oxide, the balance being a mixture which includes calcium oxide, magnesium oxide, potassium oxide and silica with less than about 1% by weight of free manganese metal.

Chemical Analysis (typical wt. %): 65.27Mn; 2.03Fe; 0.029Al; 0.28Si; 0.17C; 0.040OP; 0.045As; 0.46Ca; 1.43Mg; 0.072K; 0.023Cr; and 0.002Pb.

Bulk Density: 45-90 lbs./ft$^3$

Moisture: Typically 0.22% (1 hour at 107° C.)

Particle Size: 98% below about 10 microns. (99% will pass through a 325 mesh Tyler screen)

pH: 9-13 (50% $Mn_3O_4$ in distilled $H_2O$)

Shape: Spherical

Specific Gravity: 4.6 to 4.75 grams/cc

Thermal Stability: No effect up to 600° C.

Present day coating technology stresses the use of color pigments having a very fine particle size in order to enhance colorant efficiencies (hiding power), suspension properties and uniform distribution of the pigment throughout the paint formulation. It has been found that when used as a color pigment in accordance with the present invention, the $Mn_3O_4$ fume should have a particle size such that about 98% of the particles are less than 10 microns. Typically, $Mn_3O_4$ fume that is recovered from electro-metallurgical furnaces by conventional methods as described above may contain about 1.0 to 2.0% particles of a size greater than about 10 microns. Accordingly, it may be desirable or even necessary in some cases to eliminate these large diameter particles from the $Mn_3O_4$ fume. This may be done, for example, by conventional classification techniques or by impact methods such as ball milling. Manganomanganic oxide fume which has been classified or milled to a particle size wherein about 98% of the particles are less than 10 microns can be readily dispersed in the paint formulation with medium shear equipment such as by use of a Cowles Dissolver. Paint formulations containing $Mn_3O_4$ fume in this particle size range can generally be applied to the surface to be treated without any evidence of streaking or other imperfections.

The solvent-base paint formulation of the present invention can be prepared using most any commercial grade zinc dust such as Zinc Dust L-15 produced by Federated Metals. This material has an average particle size of about 5 microns.

Typical zinc rich solvent-base paint formulations containing a $Mn_3O_4$ color pigment fume in accordance with the present invention are represented by the following:

|    | Ingredients | Typical (% by wt.) | Preferred (% by wt.) |
|----|-------------|--------------------|-----------------------|
| A. | Resin binder | 4-25 | 8-20 |
| B. | Zinc Dust | 43-90 | 47-68 |
| C. | $Mn_3O_4$ pigment fume | 3-38 | 20-36 |
| D. | Other pigments including pigment extenders, fillers, etc. | 0-35 | 1-15 |
| E. | Pigment suspension agent | 0-5 | 0.5-3 |
| F. | Solvent | * | * |

*As required for proper application viscosity.

The solvent-base paint formulation employing a $Mn_3O_4$ fume color pigment in accordance with the present invention can be prepared by conventional methods well known in the prior art. For example, the paint formulation can be prepared by mixing the resin binder together with the $Mn_3O_4$ fume, zinc dust, other pigments and pigment suspension agents and solvent. Medium shear dispersion equipment can be used for this purpose, such as a Cowles Dissolver. This equipment consists of a vertical driven shaft having a saw tooth impeller at its lower end. When rotated, the impeller will impart a high velocity to the mixture of fluid and pigment resulting in a shear condition. Other equipment such as a ball mill may also be employed with equal success as will readily occur to those skilled in the art.

The binder used in the paint formulation of the present invention may be any one of a number of well known resins conventionally employed for this purpose in the paint industry. Generally, the binder will be chosen from one of four groups: (1) reactive binders such as epoxy resins derived from bisphenol A and epichlorhydrin which are hardened with polyamines such as polyaminoamids, diethylene triamine, triethylene tetramine or coal tar amines; (2) air drying binders such as those derived by reaction from diglycidyl ether of bisphenol A and vegetable oil fatty acids; (3) solvent soluble binders which harden by solvent evaporation such as polyhydroxy ether of bisphenol A derived from bisphenol A and epichlorhydrin (Phenoxy PKHH); and (4) binders conventionally employed in moisture curable systems such as alkyl silicate prepared by hydrolysis or polymerization of tetraethyl silicate, alcohol and glycol. Typical polyaminoamide hardened epoxy resins that can be used as the binder are those sold under the trademark Epon 1001-CX75 (Shell Chemical) which is a condensation product of epichlorhydrin and bisphenol A. This resin has an epoxide equivalent weight of 450-550 grams per gram equivalent of epoxide (ASTM D-1652) which is 75% solids in methylisobutyl ketone/xylene in a ratio 65/35. Suitable hardeners that may be employed with this resin are those sold under the trademark Versamid 415 (General Mills). These hardeners are reactive polyaminoamide resins based on polymerized vegetable fatty acids. They have an amine value of 230-246 mg. of KOH equivalent to basic nitrogen content in one gram sample and a viscosity of about 31-38 poises at the 75° C. Typical epoxy ester resin binders for use in the air drying by oxidation systems are those sold under the trademark Epotuf 38-403 (Reichhold Chemical). Polymerized ethyl silicate is a good example of a suitable binder for use in the moisture curable binder system. Useful solvent soluble binders which dry by solvent evaporation are polyhydroxy ethers derived from bisphenol A and epichlorhydrin known as "phenoxy resins" sold by Union Carbide Corp.

Other suitable solvent soluble binders that can be employed in the paint formulation include, for example, high molecular weight epoxy resins, alkyd resins, polyesters, chlorinated rubber, and vinyl chloride-vinyl acetate copolymers with or without hydroxyl or carboxyl functionality.

The blend of manganomanganic oxide fume and zinc dust pigment can be used in the paint formulation of the present invention alone or together with other conventional color pigments, pigment extenders, fillers and corrosion inhibitors. For example, $Mn_3O_4$ fume pigment can be employed together with conventional $TiO_2$ pigments as well as various types of iron oxide pigments, e.g., red or yellow iron oxides. Various pigment extenders can also be used such as talc, clays (hydrous aluminum silicate), diatomaceous silica and silica. Talc sold under the trademark Nytal 300 (RT Vanderbilt) is one example of a good pigment extender for use in the paint formulation. In addition, other corrosion inhibitive pigments such as zinc chromate, for example, may also be employed in the paint formulation.

A pigment suspension agent may also be employed. Typical suspension agents for use in the paint formulation are those sold under the trademark Benton 27 (NL Industries) which is an organic derivative of hydrous magnesium aluminum silicate, Kelecin F (Spencer Kellog), i.e., lecithin, and Nuosperse (Tenneco Chemical Co.).

The solvent used in the paint formulation of the present invention may be any one of a variety of solvents and solvent mixtures conventionally employed in solvent base paints. Suitable solvents and solvent mixtures that can be used include, for example, ketones such as methylisobutylketone (MIBK), aromatics and mixtures of ketones and aromatics. Typical aromatic solvents that can be used are xylene and toluene. Another common aromatic solvent that can be used is SC-100 (Exxon) which is based on diethyl benzene. Other commercial solvents that can be employed include Cellosolve (ethylene glycol monoethylether) and Cellosolve Acetate (ethylene glycol monoethyletheracetate), both trademarks of Union Carbide Corp. Cellosolve Acetate is recommended particularly for use as a solvent in the systems employing phenoxy resins as hereinabove described. Also in the case where the solvent soluble binder is an alkyd resin, petroleum distillate mineral spirits are generally used. Similarly, where the binder is a chlorinated rubber, both xylene and toluene are good solvents. Other suitable solvents for these binders include ketones and/or mixtures of ketones. Another solvent that may also be used in the paint formulation is a blend which contains one third each of xylene, MIBK and Cellosolve.

The paint formulations of the present invention may also include various other ingredients that are conventionally employed in solvent base paints of the prior art. For example, various additives may be employed to improve the film properties of the applied coating. Commercially available materials that may be used for this purpose include Beetle 216-8 (American Cyanamid) which is a urea resin—60% solution with Butanol/xylene; and ethyl alcohol which is recommended for use with the suspension agent Benton 27. A viscosity controlling agent such as diatomaceous earth may also be employed in the paint formulation, i.e., Celite, a trademark of Johns Manville. Other ingredients that may be employed include anti-gasing or water scavenging agents such as those sold under the trademark Syloid ZN-1 (W. R. Grace) which is a silica gel. Anti-skinning agents may also be used such as Ex-Kin No 2 (Tenneco Chemical Company).

The following examples will further illustrate the practice of the present invention:

EXAMPLE 1

A solvent-base paint formulation was prepared by blending together 120.0 grams of Phenoxy PKHH (Union Carbide Corp.); 30 grams Phenolic BKR-2620 (Union Carbide Corp.); 1.1 grams suspending agent, i.e., MPA-60 (N L Industries); 1.1 grams suspending agents, i.e., Silanox 101 (Cabot Corp.) which is a silane treated pyrogenic silica; and 179 grams of Zinc Dust L-15 (Federated Metals). Both the Phenoxy PKHH and Phenolic BKR-2620 were dissolved in Cellosolve Acetate (Union Carbide Corp.)—21% solids. The mixture was thoroughly blended in a Cowles Dissolver for a period of time sufficient to insure that all of the ingredients were uniformly dispersed throughout the paint formulation. The solids content of the paint formulation was determined to be 84% by weight solids—48% by volume solids. This paint formulation was used in a series of tests as the control.

The paint formulation so prepared was then applied to a number of test panels made from bare cold rolled steel and measuring approximately 4×6 inches. The applied coating was baked at a temperature of about 350° F. for about 15 minutes. The film thickness of the coatings was measured and the average thickness determined to be about 0.7 mils. The test panels were subjected to a salt spray corrosion test according to ASTM B 117-73 and the panels were rated in accordance with methods outlined in ASTM (D714-56, D610-68).

EXAMPLE 2

A solvent-base paint formulation was prepared using the same ingredients as those employed in the paint formulation described in Example 1, except that in this case the 179 grams of zinc dust were replaced with 118 grams of $Mn_3O_4$ fume pigment. The solids content of this paint formulation was determined to be 78% by weight solids—48% by volume solids. The paint formulations was applied to test panels made of cold rolled steel in the same manner as described in Example 1, and the average coating thickness was determined to be 0.6 mils. The test panels were subjected to the same salt spray corrosion test and were rated according to the same ASTM method.

EXAMPLE 3

A solvent-base paint formulation was prepared using the same ingredients as those employed in the paint formulation Example 2, except that in this case an increased amount of $Mn_3O_4$ fume pigment, i.e., 147.5 grams was employed. The paint formulation had a solids content of about 82% by weight solids—53% by volume solids. The paint formulation was applied to similar test panels made of cold rolled steel in the same manner as described in Example 1, and the average coating thickness was determined to be be 0.7 mils. The panels were then subjected to the same salt spray corrosion test and were rated according to the same ASTM method.

EXAMPLE 4

A solvent-base paint formulation was prepared using the same ingredients as those in the paint formulation described in Example 3, except that in this instance a greater of $Mn_3O_4$ fume pigment, i.e., 162.0 grams was employed. The paint formulation had a solids content of about 83% by weight solids—56% by volume solids. The paint formulation was applied to similar test panels made of cold rolled steel in the same manner as described in Example 1, and the average coating thickness was determined to be 0.8 mils. The panels were then subjected to the same salt spray corrosion test and were rated according to the same ASTM method.

EXAMPLE 5

A solvent-base paint formulation was prepared using the same ingredients as those employed in the paint formulation described in Example 2, except that in this instance a greater amount of $Mn_3O_4$ fume pigment, i.e., 177 grams was employed. The paint formulation had a solids content of 84% by weight solids—58% by volume solids. The paint formulation was applied to test panels made of cold rolled steel in the same manner as described in Example 1, and the average coating thickness was determined to be 0.8 mils. The test panels were then subjected to the same salt spray corrosion test and were rated according to the same ASTM method.

EXAMPLE 6

A solvent-base paint formulation was prepared using the same ingredients as those employed in the paint formulation described in Example 1, except that in this instance a reduced amount of zinc dust, i.e., 89.5 grams, was employed together with 59.0 grams of $Mn_3O_4$ fume. The paint formulation had a solids content of 82% by weight solids—48% by volume solids. The volume ratio of $Mn_3O_4$ to zinc dust was about 1:1. The paint formulation was applied to test panels made of cold rolled steel in the same manner as described in Example 1, and the coating thickness was determined to be 0.7 mils. The test panels were then subjected to the same salt spray corrosion test and were rated according to the same ASTM method.

EXAMPLE 7

A solvent-base paint formulation was prepared using the same ingredients as those employed in the paint formulation described in Example 6, except that in this instance a lesser of amount of $Mn_3O_4$ fume, i.e., 39 grams was employed together with a greater amount, i.e., 119 grams, of zinc dust. The $Mn_3O_4$ fume to zinc dust volume ratio in this instance was about 1:2. The paint formulation had a solids content of about 83% by weight solids—48% by volume solids. The paint formulation was applied to test panels made of cold rolled steel in the same manner as described in Example 1, and the average coating thickness was determined to be 0.7 mils. The test panels were then subjected to the same salt spray corrosion test and were rated according to the same ASTM method. The results of the salt spray corrosion tests in Examples 1–7 are given in Table I below.

TABLE I

Corrosion Resistance of $Mn_3O_4$ Fume Coatings With and Without Zinc Dust

| Example | Pigment | Pigment Quantity (Grams) | Test Period (Hrs.) | Corrosion | Blisters |
|---|---|---|---|---|---|
| 1 | Zinc Dust | 179 | 100 | 8 | 8M |
| 1 | Zinc Dust | 179 | 260 | 7 | 8M |
| 1 | Zinc Dust | 179 | 360 | 7 | 8M |
| 2 | $Mn_3O_4$ | 118 | 100 | 8 | 6-8MD |
| 2 | $Mn_3O_4$ | 118 | 260 | 8 | 6-8MD |
| 2 | $Mn_3O_4$ | 118 | 360 | 5 | 6-8MD |
| 3 | $Mn_3O_4$ | 147.5 | 100 | 9 | |
| 3 | $Mn_3O_4$ | 147.5 | 260 | 4 | 6-8MD |
| 3 | $Mn_3O_4$ | 147.5 | 360 | 4 | 6-8MD |
| 4 | $Mn_3O_4$ | 162 | 100 | 4 | 8M |
| 4 | $Mn_3O_4$ | 162 | 260 | 0 | 0 |
| 4 | $Mn_3O_4$ | 162 | 360 | 0 | 0 |
| 5 | $Mn_3O_4$ | 177 | 100 | 3 | 8D |
| 5 | $Mn_3O_4$ | 177 | 260 | 0 | 0 |
| 5 | $Mn_3O_4$ | 177 | 360 | 0 | 0 |
| 6 | $Mn_3O_4$; Zinc Dust | 59;89.5 | 100 | 10 | 8D |
| 6 | $Mn_3O_4$; Zinc Dust | 59;89.5 | 260 | 10 | 8D |
| 6 | $Mn_3O_4$; Zinc Dust | 59;89.5 | 360 | 8 | 8D |
| 7 | $Mn_3O_4$; Zinc Dust | 39;119 | 100 | 9 | 8MD |
| 7 | $Mn_3O_4$; Zinc Dust | 39;119 | 260 | 7 | 8MD |
| 7 | $Mn_3O_4$; Zinc Dust | 39;119 | 360 | 7 | 8MD |

It will be seen from the results of Table I that the paint formulation of Example 2 containing 48% by volume $Mn_3O_4$ fume pigment exhibited a corrosion resistance which was about equal to the corrosion resistance to the paint formulations containing the same volume % of the zinc dust up to about 260 hours of test. It will, of course, be realized that the paint formulations containing the zinc dust as a corrosion inhibitive pigment are very well known for their high performance under salt spray conditions and therefore these paint formulations were used primarily as the control. It will also be seen that increasing the amount of $Mn_3O_4$ fume beyond 118 grams or 48% by volume did not improve the corrosion resistant properties of the paint formulation but on the contrary drastically reduced the effectiveness of the pigment in prohibiting corrosion. Finally, it will be seen from Table I that surprisingly superior results are achieved beyond that of the control when the $Mn_3O_4$ fume is combined with the zinc dust and further that this improvement was demonstrated over the entire test period, i.e., 360 hours. The effectiveness of using the $Mn_3O_4$ fume to inhibit corrosion in a zinc rich paint formulation in most cases is dependent on the $Mn_3O_4$—zinc dust volume ratio. Superior results are attained when this ratio is maintained at about 1:1 by volume.

Manganomanganic oxide and zinc pigmented phenoxy base coatings shown in Table I were examined by scanning electron microscopy to compare coating surfaces in order to determine the protective mechanism of these systems.

After exposure to a 100 hour salt spray, the zinc particles of Example 1 were coated with crystalline corrosion products which have a tendency to plug the pores of the coating and thereby protect the substrate. The $Mn_3O_4$ fume of Example 2 on the other hand appeared to erode away. Its corrosion products however are probably capable of producing a passivating coating on the surface of the steel.

The protective action of the combination of the $Mn_3O_4$ fume and zinc dust appears to be due to the formation of a new compound on compounds during exposure to the salt spray. The crystalline corrosion products formed are different from those formed by either zinc or $Mn_3O_4$ fume during salt spray. The formation of these new products probably decreases the penetration rate of the corrosion salt by their close packing patterns. Hexagonal plates were clearly visible.

What is claimed is:

1. A paint formulation comprising: from about 4 to 25% by weight of a resin binder comprising an epoxy resin compound derived from bisphenol A and epichlorhydrin which are hardened with polyamines selected from the group consisting of polyaminoamides, diethylene triamine, triethylene tetramine and coal tar amines; from about 43 to 90% by weight zinc dust; from about 3 to 38% by weight $Mn_3O_4$ fume pigment; from 0 to about 35% by weight of additional pigments including pigment extenders and fillers; from 0 to 5% by weight of a pigment suspension agent; and the balance being a solvent in an amount required for proper application viscosity.

2. A paint formulation according to claim 1 containing 47 to 68% by weight zinc dust.

3. A paint formulation according to claim 1 containing 20 to 36% by weight $Mn_3O_4$.

4. A paint formulation according to claim 1 containing from about 1 to 15% by weight of additional pigments including pigment extenders and fillers.

5. A paint formulation according to claim 1 containing from about 0.5 to 3% by weight of a pigment suspension agent.

6. A paint formulation according to claim 1 wherein said solvent is selected from the group consisting of ketones, aromatic solvents and mixtures of ketones and aromatic solvents.

7. A paint formulation according to claim 1 further including an additive to improve film properties comprising urea resin or ethyl alcohol.

8. A paint formulation according to claim 1 further including a viscosity controlling agent.

9. A paint formulation according to claim 1 further including an anti-gasing or water scavenging agent.

10. A paint formulation comprising: from about 4 to 25% by weight of a resin binder comprising an air drying resin compound derived by reaction from diglycidyl ether of bisphenol A and vegetable oil fatty acids; from about 43 to 90% by weight zinc dust; from about 3 to 38% by weight $Mn_3O_4$ fume pigment; from about 0 to about 35% by weight of additional pigments including pigment extenders and fillers; from 0 to 5% by weight of a pigment suspension agent; and the balance being a solvent in an amount required for proper application viscosity.

11. A paint formulation comprising: from about 4 to 25% by weight of a resin binder which is a solvent soluble resin compound comprising polyhydroxy ether of bisphenol A derived from bisphenol A and epichlorhydrin; from about 43 to 90% by weight zinc dust; from about 3 to 38% by weight $Mn_3O_4$ fume pigment; from about 0 to 35% by weight of additional pigments including pigment extenders, and fillers; from 0 to 5% by weight of a pigment suspension agent; and the balance being a solvent in an amount required for proper application viscosity.

* * * * *

UNITED STATES PATENT AND TRADEMARK OFFICE
CERTIFICATE OF CORRECTION

PATENT NO. : 4,417,007
DATED : November 22, 1983
INVENTOR(S) : George A. Salensky; Kuldip S. Chopra; Nicholas J. Pappas It is certified that error appears in the above-identified patent and that said Letters Patent are hereby corrected as shown below:

Column 1, line 66, delete the second occurrence of "tapped".

Column 2, line 53, delete "main" and substitute therefor --resin--.

Column 3, line 37, delete "0.040 OP" and substitute therefor --0.040 P--.

Signed and Sealed this

Eleventh Day of June 1985

[SEAL]

Attest:

DONALD J. QUIGG

Attesting Officer

Acting Commissioner of Patents and Trademarks